(No Model.) 2 Sheets—Sheet 1.

J. W. COVER & M. O. TIBBITS.
CABLE CLIP.

No. 554,335. Patented Feb. 11, 1896.

Witnesses.
L. G. Kelsey Jr.
Belle Hushed

Inventors.
J. W. Cover,
M. O. Tibbits,
by H. L. Reynolds
their atty.

(No Model.) 2 Sheets—Sheet 2.

J. W. COVER & M. O. TIBBITS.
CABLE CLIP.

No. 554,335. Patented Feb. 11, 1896.

Witnesses.
S. F. Kelsey Jr.
Belle Hughes

Inventors.
J. W. Cover,
M. O. Tibbits;
by H. L. Reynolds
their atty.

UNITED STATES PATENT OFFICE.

JOHN W. COVER AND MILTON O. TIBBITS, OF EVERETT, WASHINGTON.

CABLE-CLIP.

SPECIFICATION forming part of Letters Patent No. 554,335, dated February 11, 1896.

Application filed January 22, 1895. Serial No. 535,819. (No model.)

*To all whom it may concern:*

Be it known that we, JOHN W. COVER and MILTON O. TIBBITS, citizens of the United States, residing at Everett, in the county of Snohomish and State of Washington, have invented certain new and useful Improvements in Cable-Clips; and we do hereby declare the following to be a full, clear, and exact description of the invention, such as will enable others skilled in the art to which it appertains to make and use the same.

Our invention relates to a clip for attaching buckets, paddles or any other objects to cables in such a way that they will not interfere with the passing of the cable and the clips over pulleys, and also to the construction of the pulleys by which the slipping of the cable thereon is made impossible.

The object is to produce a cable-clip and wheel which may be used for such work as water-motors, elevators for water, grain, ores and other similar materials, and which may be quickly attached to the cable, will hold securely thereon, has simple means for attaching the buckets, paddles, &c., and will engage with the wheel to prevent slipping of the cables thereon.

Figure 1:
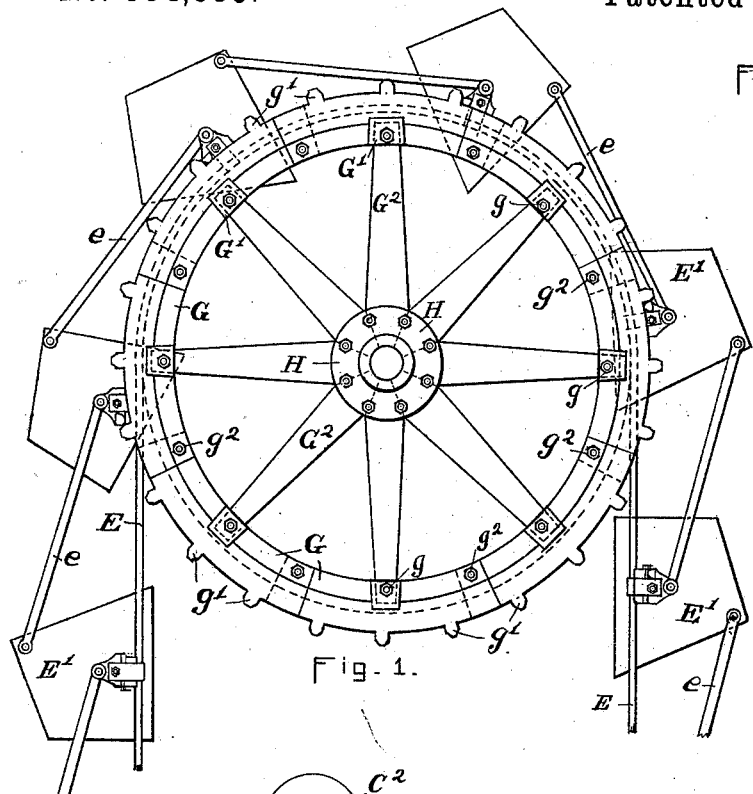
Figure 4:
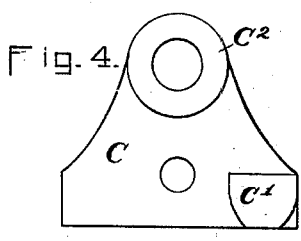
Figure 5:
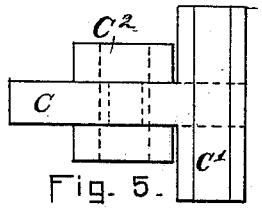
Figure 6:
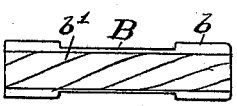
Figure 2:
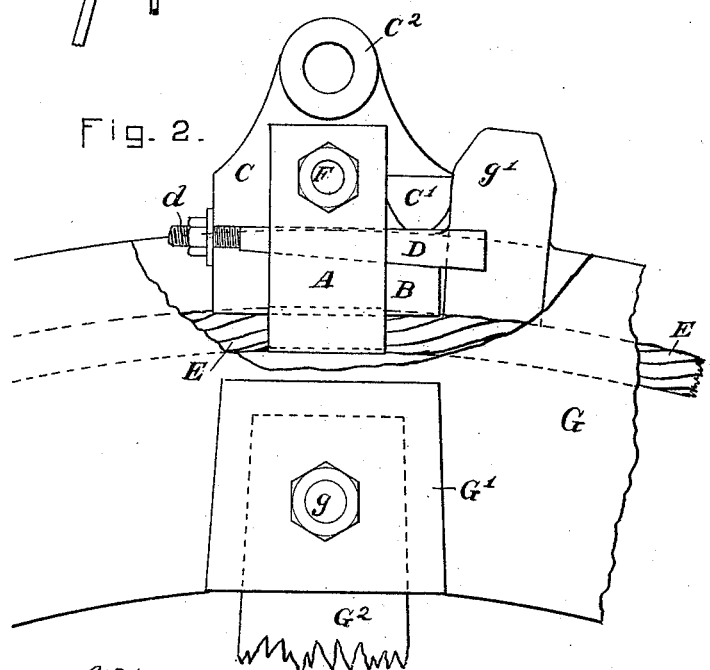
Figure 3:
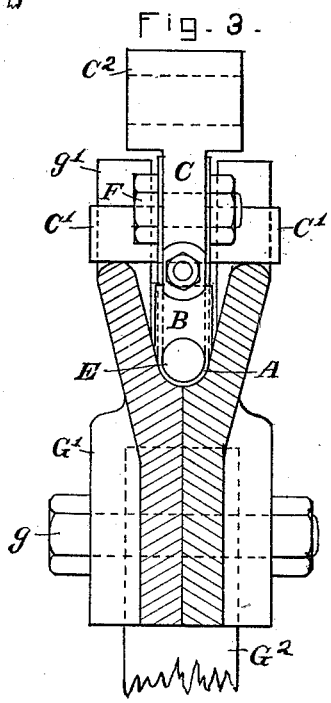
Figure 7:
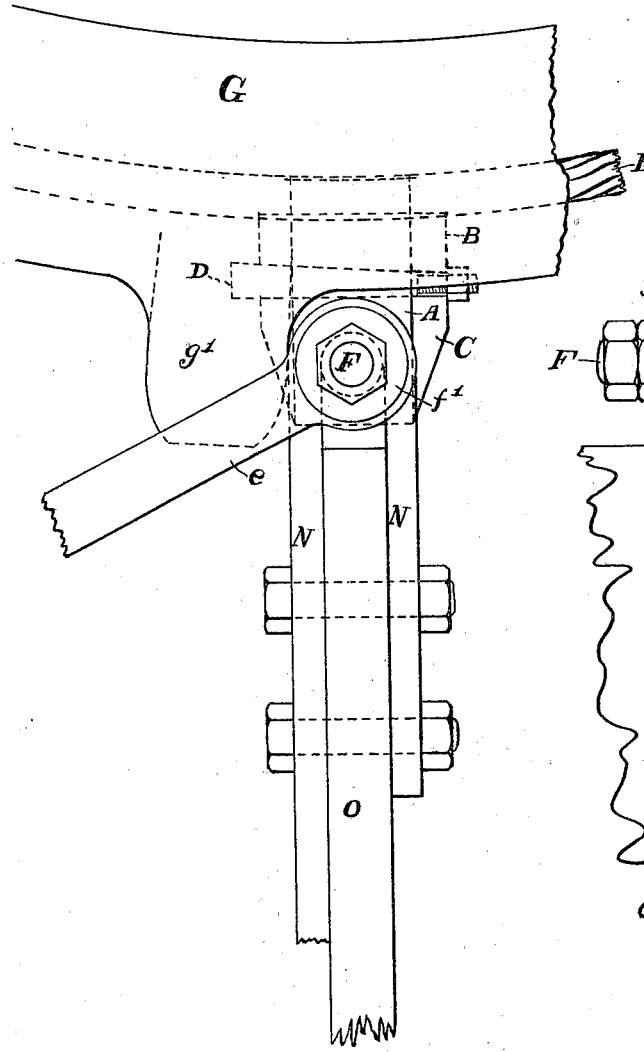
Figure 8:
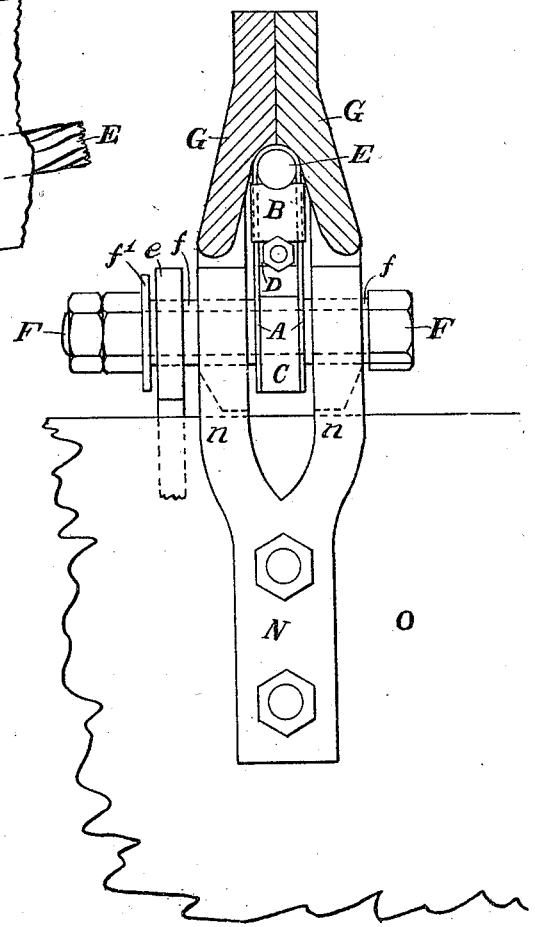

Figure 1 shows a wheel with a section of cable having clips and buckets attached thereto and passing over it. Fig. 2 is a side view of a section of the rim of the wheel and a clip. Fig. 3 is a cross-section of the wheel-rim and an end view of the clip. Figs. 4 and 5 are side and bottom views of the pivot-block of the clip. Fig. 6 is a bottom view of the shoe of the clip. Fig. 7 is a side view of a section of the wheel-rim and the clip with a slightly-modified form of construction and with a paddle attached. Fig. 8 is a cross-section of the wheel-rim and end view of the clip.

In making such machines as water-motors and material elevators built on the endless-conveyer principle the use of chains provides a convenient means for attaching the paddles, buckets, or whatever is desired thereto, but is a source of trouble by reason of the fact that the numerous joints in the chains wear in use and the chain lengthens, while the sprocket-wheels, which are usually used for them to run over, become of a less circumference by wear, thus causing the chain to grind and ride on the sprockets, thus consuming much power. The difficulty in using cables is to obtain an efficient clip which will hold securely, and to which the buckets, paddles, &c., may be readily attached and to prevent the cables slipping or creeping on the wheels.

Our clip is constructed as follows, the clip, as shown in Figs. 2 to 6, inclusive, being first described.

The cable E has a thin metal strap A bent around it and bolted by the bolt F to a block C. Between the sides of this strap and next to the cable is the shoe B, which is pressed firmly upon the cable by means of the wedge D. This wedge is driven tightly between the shoe B and the pivot-block C, and is then secured to prevent loosening by a nut $d$ screwed on the thin end, which is screw-threaded. This nut bears upon the ends of the pivot-block and the shoe, and prevents the wedge or key from backing out.

The shoe B is thicker at the ends than in the center, forming a shoulder at $b$, (see Fig. 6,) which engages with the edges of the strap A, and prevents its slipping out. The concave surface next to the cable is also made grooved similar to the surface of a wire cable or with ridges running in the same general direction as the strands of the cable, which enables it to be more firmly held on the cable and prevents slipping or turning thereon. This grooving of the concave surface of the shoe while preferable is not strictly essential.

The pivot-block C has a boss $C^2$, having a hole in it for attaching thereto the bucket, paddle, or whatever is desired to attach to the cable. It also has nearer to the cable the projecting pins $C'$ upon each side, which are intended to engage projections or teeth $g'$ on the rim of the wheel to prevent slipping or creeping of the cable thereon.

The wheel is made as follows: The center is formed by bolting the two cast-iron flanges H over the wooden spokes $G^2$, and the rim by bolting together the segments G. These segments reach only to the center of the rim, each segment forming one side only of the V-groove, as seen in Figs. 3 and 8. Where the spokes are attached a pocket $G'$ is formed by opposite recesses in each, and the end of the spoke $G^2$ inserted, the whole being held together by a bolt $g$, through the opposite segments and the end of the spoke.

There are two segments for each spoke, and one end of each segment, measured from the spoke, is longer than the other. The segments on each side of the wheel are just alike, the result being that each half of all the segments projects beyond the other half of the same segment at one end, and the adjacent segments have their projecting halves lapping by each other and a bolt $g^2$, put through, by which means the entire rim is secured together.

If desired, a large washer or a plate may be placed under each end of the bolt $g^2$, lapping over onto the loose end of the adjacent segment, thus securing them more firmly together. This form of construction makes a wheel composed of small and easily handled and transported members, and yet when put together a strong and stiff wheel.

A larger number of projecting teeth $g'$ are formed on the rim than will be in use at any one time, the number being made such that the tooth engaged by the clips will drop back one tooth at each revolution, so as to make an even wear on all the teeth, or else so that one set of teeth may be used for awhile and then the cables slipped so that another set will be brought into use.

The depth of the V-groove in the wheel and the clip are so proportioned that the projecting lugs $C'$ of the clip will rest upon the outer edge of the rim.

In cases where the buckets, paddles or whatever is attached to the cables are attached to more than one cable it is important that there shall be no slipping or creeping of either cable. This is accomplished by the use of the teeth $g'$ on the wheel and the lugs or pins $C'$ on the clips.

In Fig. 1 we have shown our invention as in use with buckets $E'$ on an elevator. This might be used as a water-wheel where a fall of water is available, the water being received in the buckets on the left side and discharged at the bottom. The rods $e$ serve to maintain the buckets right side up while coming up, and their reversal while passing over the wheel.

In Figs. 7 and 8 we have shown a slightly-different form of clip and have also shown a paddle O attached to the clip. This shows its use upon a current-motor. Either form of clip might be used for any of these purposes, however. In this form of clip the projecting pivot, bosses $C^2$, and the lugs or pins $C'$ are omitted from the block C. Instead thereof the bolt F is made longer and is surrounded on each side of the strap A with a short piece of pipe $f$, which transmits the pressure from the head and nuts of the bolt to the strap A to clamp it upon the block C.

The strap or eye pivoting the bucket or paddle to the clip is hinged upon these short pipe-sections, and the teeth or lugs $g'$ on the wheels engage the strap N. This strap N is split into two parts $n\ n$, which engage the pivots on each side of the block C. One or both ends of this strap N may extend down across the full width of the bucket, serving to strengthen it and hold it together, or may be cut off, as indicated on one side of Figs. 7 and 8. The brace or guy rod $e$ has an eye passing over this pivot on one side, and a washer $f'$ prevents it from coming off. This form of clip brings the pivot of the bucket, paddle, &c., nearer to the cable than does the other, thus causing less kinking or bending strains on the cable, the arm for the force being less than in the other style.

The clip might also be made leaving the pivot as in Figs. 2 and 3, but removing the lugs $C'$ and substituting the pipes $f$ and utilizing them to engage directly with the teeth or lugs $g'$ on the wheel. This would bring the wear of the clip upon the pipe-sections, a part which could be cheaply and easily replaced when worn.

In both forms of the invention the wedge and the shoe extend parallel with the strap and longitudinally of the cable.

Having thus described our invention, what we claim, and desire to secure by Letters Patent, is—

1. In an endless conveyer, the combination with a strap passing about the cable, a pivot-block between the ends of the strap and means for securing the strap thereto, of a shoe lying between the strap and next to the cable, a wedge or key between the shoe and block, said wedge or key extending parallel with the sides of the strap and longitudinally of the cable, and a screw-thread and nut upon the small end of the wedge or key, said nut engaging one of the other members to prevent the withdrawal of the wedge or key, substantially as and for the purposes described.

2. In an endless conveyer, the combination with a strap passing about the cable, a pivot-block between the ends of the strap, means for securing the strap thereto, and projections extending laterally from the pivot-block, of a shoe lying between the sides of the strap and next to the cable, a wedge or key between the shoe and block, extending parallel with the sides of the strap and longitudinally of the cable, and a screw-thread and nut upon the small end of the wedge or key, said nut engaging one of the other members to prevent the withdrawal of the wedge or key, substantially as shown and described.

3. In an endless conveyer, the combination with a strap passing about the cable and a block between the ends of the strap, of a shoe lying between the sides of the strap and next to the cable, a wedge or key between the block and shoe extending parallel with the sides of the strap and longitudinally of the cable, and means for preventing the withdrawal of the wedge or key, substantially as shown and described.

4. In an endless conveyer, the combination with a strap passing about the cable, and a block between the ends of the strap, of a bolt passing through the strap and block and elongated washers or pipe-sections surrounding the bolt outside the strap and forming a pivot-pin, substantially as shown and described.

5. In an endless conveyer, the combination with a wheel having a circumferential groove, and lugs or teeth projecting radially from the edge of said groove, of an endless cable occupying said groove, clips upon said cable composed of a strap surrounding the cable, a block between the ends of the strap, a shoe and wedge between the block and the cable, a bolt passing through the block and the strap, elongated washers or pipe-sections surrounding the bolt outside the strap and in position to engage the lugs or teeth on the wheel, substantially as shown and described.

6. In an endless conveyer, the combination with a wheel having a circumferential groove, and lugs or teeth projecting radially from the edge of said groove, of an endless cable occupying said groove, clips upon said cable composed of a strap surrounding the cable, a block between the ends of the strap, a shoe and wedge between the block and the cable, a bolt passing through the block and the strap, elongated washers or pipe-sections surrounding the bolt outside the strap, and a pivot-strap surrounding these washers or pipes for attaching thereto the buckets or other similar devices, substantially as shown and described.

In testimony whereof we affix our signatures in presence of two witnesses.

JOHN W. COVER.
MILTON O. TIBBITS.

Witnesses:
J. B. MURPHY,
H. L. REYNOLDS.